United States Patent
Dasbach et al.

(10) Patent No.: US 12,028,372 B1
(45) Date of Patent: Jul. 2, 2024

(54) IDENTIFYING THREAT SIMILARITY USING FORENSICS CLUSTERING

(71) Applicant: Proofpoint, Inc., Sunnyvale, CA (US)

(72) Inventors: Garrick Dasbach, Carmel, IN (US); Jonathan Ogilvie, Westfield, IN (US)

(73) Assignee: PROOFPOINT, INC., Sunnyvale, CA (US)

( * ) Notice: Subject to any disclaimer, the term of this patent is extended or adjusted under 35 U.S.C. 154(b) by 504 days.

(21) Appl. No.: 17/213,684

(22) Filed: Mar. 26, 2021

Related U.S. Application Data

(60) Provisional application No. 63/132,073, filed on Dec. 30, 2020.

(51) Int. Cl.
*H04L 9/40* (2022.01)

(52) U.S. Cl.
CPC ...... *H04L 63/1483* (2013.01); *H04L 63/1416* (2013.01); *H04L 63/1425* (2013.01); *H04L 63/1433* (2013.01)

(58) Field of Classification Search
USPC ........................................................ 726/22
See application file for complete search history.

(56) References Cited

U.S. PATENT DOCUMENTS

| | | | | |
|---|---|---|---|---|
| 8,005,300 B2 * | 8/2011 | Koyama | ............. | G06F 16/5846 382/229 |
| 9,720,925 B1 * | 8/2017 | Lawson | ................ | G06F 40/194 |
| 11,456,080 B1 * | 9/2022 | Jain | ...................... | A61B 5/4815 |
| 2015/0067839 A1 * | 3/2015 | Wardman | ............... | G06Q 10/10 726/22 |
| 2019/0230098 A1 * | 7/2019 | Navarro | ................ | G06F 21/577 |
| 2020/0304528 A1 * | 9/2020 | Ackerman | .......... | H04L 63/0227 |

FOREIGN PATENT DOCUMENTS

| | | | | |
|---|---|---|---|---|
| CN | 110537180 A | * | 12/2019 | ........... G06F 16/951 |

* cited by examiner

*Primary Examiner* — Sakinah White Taylor
(74) *Attorney, Agent, or Firm* — SPRINKLE IP LAW GROUP

(57) ABSTRACT

Systems, methods and products for identifying "similar" threats by clustering the threats based on corresponding forensics. A corpus of forensic data for a plurality of threat URLs is obtained by a threat protection system, the data including forensic elements corresponding to each threat URLs. For each pair of threat URLs, the corresponding forensic elements are examined to identify shared forensic elements. A similarity score is then generated for the pair of threat URLs based on the comparison of the corresponding forensic elements, including both malicious and non-malicious elements. Based on the similarity score generated for each pair of threat URLs, clusters of the threat URLs are identified, with each cluster including a subset of the plurality of threat URLs. Clusters of URLs similar to a selected URL may be identified by accessing the threat cluster information using a similar-threat search interface or through internal APIs of the threat protection system.

15 Claims, 7 Drawing Sheets

IDENTIFYING THREAT SIMILARITY USING FORENSICS CLUSTERING

RELATED APPLICATIONS

This application claims priority under 35 U.S.C. § 119(e) to U.S. Provisional Application No. 63/132,073, entitled "Identifying Threat Similarity Using Forensics Clustering", filed Dec. 30, 2020, which is fully incorporated herein by reference for all purposes.

FIELD OF THE INVENTION

This invention relates generally to cybersecurity, and more particularly to systems, methods, and computer program products for identifying "similar" threats by clustering the threats based on activities or behaviors launched or caused by potentially threatening URLs or content within the URLs.

BACKGROUND

Today, cyberthreat protection technologies can generally protect enterprise computing networks from attacks and threats originating from malicious or otherwise suspicious universal resource locator (URL) links owned and/or operated by bad actors. Such URLs may be found through a URL scanning process in which the content to which a malicious or suspicious URL is pointed is opened in a isolated or "sandboxed" environment to determine whether the URL exhibits malicious behaviors. Sandboxing, as used herein, refers to any suitable method of analyzing the URL, the domain, or a corresponding website in a controlled and/or isolated computing environment that is separate and independent from the computing environment of an end user (e.g., an email recipient), so as to protect the end user's computing environment from any potential malicious threats or attacks.

After malicious URLs have been identified, they may be addressed by the threat protection technologies that are in place. For instance, a URL may be included in an email message in an attempt to phish the recipient, directing the recipient's browser to the malicious URL and potentially damaging the recipient's computing environment. A threat protection system may therefore remove the malicious URL from the email message before allowing it to be delivered to the recipients' inbox.

The threat protection system may utilize various techniques which allow it to more efficiently and effectively address malicious URLs. For example, one type of technique involves the clustering of the threat URLs. Clustering, as used herein, refers to the identification of multiple URLs as being related, so that the related URLs can be addressed as a group, rather than individually. Clustering URLs may enable the threat protection system to address these threats more efficiently and effectively. Clustering or grouping threats also reduces the problem of users having to click through threats individually, which may worsen the user experience.

Existing clustering techniques, however, may be limited in their ability to identify clusters of related URL threats. For instance, some systems cluster URLs together using URL rollups in which URLs that are similar, or are part of the same URL hierarchy. Because they are based on having similar URLs, or being part of the same hierarchy, URL rollups do not identify threat URLs across URL spaces. Other systems may rely on human analysts to manually identify groups of related threats, but the need to manually group threats may be costly, time-consuming and inconsistent.

It would therefore be desirable to provide improved techniques for grouping threat URLs which reduce or eliminate one or more of the shortcomings of existing techniques.

SUMMARY OF THE DISCLOSURE

Embodiments of the invention identify "similar" threats by clustering the threats based on forensics of the threat. The various embodiments may include standalone products for clustering threats, as well as add-ons to existing threat protection systems, and may be implemented as both user-facing product and an internal tools of threat protection systems. Embodiments may be implemented, for example, in a search feature that enables a user to select a particular URL threat and the search returns a list of related URL threats that have been clustered with the selected URL based on the forensic data associated with each of the URLs. Information on the clustered URL threats may alternatively be accessed via APIs of the threat clustering system and may be used as a component of an enrichment process for performing threat response.

One embodiment comprises a method in which a corpus of forensic data for a plurality of threat URLs is obtained. The corpus of forensic data includes, for each of the plurality of threat URLs, a set of corresponding forensic elements. These forensic elements may include, for example, URLs reached, exploits or techniques used, files distributed, etc. Some of the forensic elements may be malicious, while others are not malicious. For each pair of threat URLs in the plurality of URLs, the corresponding forensic elements are examined and the forensic elements of a first threat URL of the pair are compared to forensic elements of the second threat URL of the pair. A similarity score is then generated for the pair of threat URLs based on the comparison of the corresponding forensic elements. Based on the similarity score generated for each pair of threat URLs, clusters of the threat URLs are identified, with each cluster including a subset of the plurality of threat URLs.

In some embodiments, the method further comprises generating a similar-threat search interface which is configured to receive user input identifying a selected one of the plurality of threat URLs. A set of one or more threat URLs that are in the same cluster as the selected one of the plurality of threat URLs is then retrieved from stored indications of the threat URLs that are in each of the identified clusters. The retrieved threat URLs are then presented (e.g., displayed) at the similar threat search interface.

In some embodiments, unique forensic elements are eliminated or removed from consideration prior to comparing the forensic elements of each pair of threat URLs. In some embodiments, super-node forensic elements which are shared by at least a predetermined percentage of the plurality of threat URLs are eliminated or removed from consideration prior to comparing the forensic elements of each pair of threat URLs.

In some embodiments, generating the similarity score for each pair of threat URLs includes generating a raw similarity score, wherein the raw similarity score is based on all types of shared forensic elements of the first threat URL and the second threat URL. For instance, the generation of the raw similarity score for each pair of threat URLs may comprise determining a number $N_1$ of forensic elements of all types of the first threat URL, determining a number $N_2$ of forensic elements of all types of the second threat URL, determining a number $N_S$ of forensic elements of all types shared by the first threat URL and the second threat URL, and calculating the raw similarity score $S_R$ using the equation $S_R=(N_S*2)/(N_1+N_2)$.

In some embodiments, generating the similarity score for each pair of threat URLs includes generating a technique similarity score, wherein the technique similarity score is based on a number of shared malicious forensic elements of the first and second threat URLs of the pair. Generating the technique similarity score for the pair of threat URLs may comprise, for example, determining a number $N_M$ of forensic elements of malicious types shared by the first threat URL and the second threat URL, determining a number $N_S$ of forensic elements of all types shared by the first threat URL and the second threat URL, and calculating the technique similarity score $S_T$ using the equation $S_T=N_M/N_S$.

In some embodiments, generating the similarity score for each pair of threat URLs comprises generating a mutual similarity score, including generating a raw similarity score based on all types of shared forensic elements of the first and second threat URLs, generating a technique similarity score based on a number of shared malicious forensic elements of the first and second threat URLs, and generating the mutual similarity score as a weighted combination of the raw similarity score and the technique similarity score. The raw similarity score $S_R$ and technique similarity score $S_T$ for the pair of threat URLs may be determined as set forth above, and the mutual similarity score $S_M$ for the pair of threat URLs may be generated by calculating the mutual similarity score $S_M$ using the equation $S_M=S_R*W_R+S_T*W_T$, where $W_R$ and $W_T$ are weighting factors.

In some embodiments, identifying clusters of the plurality of threat URLs comprises providing the similarity scores of each pair of threat URLs to a clustering engine, the clustering engine analyzing the similarity scores of the pairs of threat URLs as distances, with greater similarity scores corresponding to closer distances between the corresponding pair of threat URLs, identifying one or more clusters of the threat URLs, where the threat URLs for each of the identified clusters are deemed to have a high degree of similarity based on the similarity scores, and storing indications of the threat URLs contained in each of the identified clusters. The clusters of the threat URLs may be identified, for example, using a neighborhood clustering algorithm. The indications of the threat URLs may be stored in a lookup table which is accessible to look up a selected threat URL, the lookup table identifying each threat URL in the one of the clusters that includes the selected threat URL.

In some embodiments, obtaining the corpus of forensic data comprises, for each of the plurality of threat URLs, performing a scan of the threat URL and recording resulting forensic elements resulting from the scan. The scan of each threat URL may comprise, for example, opening the threat URL in a sandboxed environment and recording resulting behaviors as forensic elements.

One alternative embodiment comprises a system having a processor coupled to a memory, where the memory stores instructions which are executable by the processor to perform a method as described above. Another alternative embodiment is a computer program product comprising a non-transitory computer-readable medium storing instructions executable by one or more processors to perform a method as described above.

Embodiments disclosed herein may provide a number of advantages over the prior art by making use of forensics data associated with the threat URLs to identify related URLs, and to improve the capability of the threat protection system to cluster threat URLs. Embodiments disclosed herein receive a corpus of data corresponding to previously identified threat URLs, and examine forensic elements within the data to identify forensic elements that are common to one or more of the threat URLs. Mutual similarity scores between each pair of threat URLs are generated based on the identified common forensic elements, including both malicious elements and non-malicious elements. A graph-based tool is then used to identify clusters of these URLs which are close to each other, based on "distances" corresponding to the similarity scores. The resulting data may be accessed via a customer-facing search interface which enables a user to select a particular threat URL, and returns a list of the threat URLs that are grouped in the same cluster as the selected URL. Alternatively, the threat URL cluster data may be accessed by users via internal APIs of the threat protection system.

Embodiments disclosed herein may provide a number of benefits. For example, the ability to group threats based on forensic similarity may reduce the time required by analysts to investigate the threats. The present embodiments may also identify new threat variants that share forensic similarity with known threats. Further, these embodiments may enable identification of new threat indicators based on common forensics between large groups of the same threat or variant, some of which might not have been identified by more subjective manual review of the threats.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
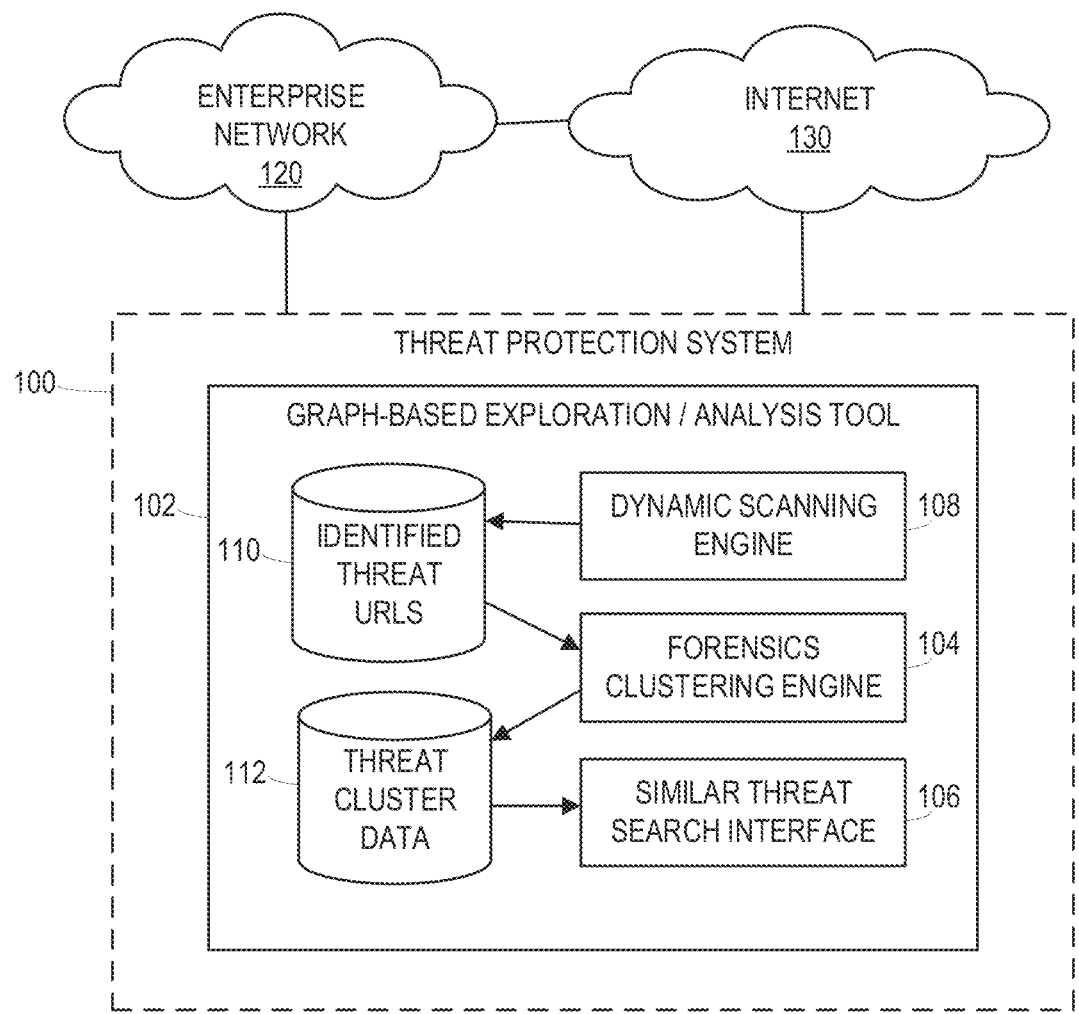
FIG. 1 is a diagram illustrating a threat protection system capable of operating in a network computing environment according to some embodiments.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Embodiments of the present invention identify "similar" threats by clustering the threats based on forensics of the threat. The various embodiments may include standalone products for clustering threats, as well as add-ons to existing threat protection systems, and may be implemented as both user-facing product and an internal tools of threat protection systems. Embodiments may be implemented, for example, in a search feature that enables a user to select a particular URL threat and the search returns a list of related URL threats that have been clustered with the selected URL based on the forensic data associated with each of the URLs. Information on the clustered URL threats may alternatively be accessed via APIs of the threat clustering system and may be used as a component of an enrichment process for performing threat response.

Current threat protection systems scan URLs to determine whether they exhibit malicious or suspicious behaviors. When a suspected malicious URL is identified, the URL may be analyzed using static and/or dynamic malware analyses. Static or code analysis is usually performed by dissecting the different resources of the binary file without executing it and studying each component. The binary file can also be disassembled (or reverse engineered) using a disassembler such as IDA or Ghidra.

Dynamic or behavioral analysis is performed by observing the behavior of the malware while it is actually running on a host system. This form of analysis is often performed in a sandboxed environment that prevents the malware from actually infecting the system and allows the system to be rolled back to a clean state. The things that happen when the URL is opened are recorded by the system as forensic elements. For instance, the system records whether the URL reached out to any DNS addresses, whether the URL downloaded any files or data, whether the URL attempted to access any registry keys, and so on. Each of the actions or behaviors is a forensic element associated with the URL. All of these forensic elements are captured and this information is stored.

Forensic elements are simply any behavior that a sample (e.g., URL) exhibits when it is executed. The forensic elements may include a wide variety of specific elements and may be generated, identified and/or classified in a variety of different ways. The techniques disclosed herein are not limited to specific types of forensic elements or specific approaches for scanning and identifying the forensic elements, and the examples provided here are intended to be illustrative of these approaches and element types. The things that are primarily of interest in these scans of the sample are indicators of compromise (IoCs) that can be used for early detection of future attack attempts using intrusion detection systems and antivirus software. Typical IoCs include virus signatures and IP addresses, MD5 hashes of malware files, or URLs or domain names of botnet command and control servers. Other types of forensic elements that may be identified and used in the present embodiments may include, for example, file accesses and network connections, files that are created, accessed or modified, registry keys that are created, accessed or modified, webpages that are requested, domain lookups that are performed, network connections that are made or attempted, complex behaviors that are identified by heuristics, etc. The heuristics may identify combinations of various activities which are marked as a behavior and are reported as independent forensic elements.

It should be noted that, while the exemplary embodiments described herein focus on URLs, similar techniques can be applied to any type of threat for which mutual forensic elements (those shared by different threats) can be identified. For example, one alternative embodiment could apply the disclosed techniques to email file attachments to identify shared forensic elements of the attachments and determine "distances" between the attachments (and corresponding similarities) based on the shared forensic elements.

While existing systems capture this forensic information, this information is not normally used to determine whether the malicious URLs are related. Instead, existing systems may use techniques such as feature analysis or URL rollups to try to group URLs that are similar. In URL rollups, only differentiation is their URL pattern. For instance, there might be many URLs that are email targeted, so they are all different URLs, but the only difference may be that they each have a different email address in the URL. Typically, a URL rollup would be created so that the system doesn't attempt to independently identify each individual URL as a threat, but instead matches a corresponding pattern of the URLs as a particular class of threats. Thus, while URL rollups try to group similar URLs, they are based on URL elements, rather than forensic elements. The approach used in URL rollups is therefore different than the approach used by the present systems and methods that identify forensic similarities between the URLs (which would not necessarily be evident from the URLs themselves).

The techniques implemented in the present embodiments involve graph clustering based on the forensic elements that are identified for a URL when it is scanned. As noted above, the URL is opened in an isolated, sandboxed environment, and all of the behaviors that occur when the URL is opened are recorded as forensic elements. Those URLs that are identified as threats are then stored, along with their corresponding forensic elements. The threat URLs and the corresponding forensic data form a corpus of data that is used as the basis of the forensic clustering in the present embodiments. This corpus of data for the URLs previously identified as threats or potential threats is examined to identify ones of the forensic elements that are common to different threats. The common forensic elements are used to score the threat URLs to determine a "distance" between the URLs based on a formula that considers both malicious and non-malicious forensic elements. A graph neighborhood technique is then used to group "similar" threats based on the calculated "distance".

The forensic clustering technique used in the present embodiments improves the grouping of threats by comparison to previous techniques. The grouping of threat URLs based on common forensic elements may provide a number of advantages. For example, the grouping of threats using this technique to provide "similar" threat information avoids the need for a user to click through multiple, ungrouped threats, and thereby provides customers with an improved experience. Further, the clustering of threats using this forensics-based technique allows customers to identify threat clusters that should be campaigned together. The use of forensics-based clustering may provide other benefits as well.

FIG. 1 is a diagram illustrating a threat protection system capable of operating in a network computing environment according to some embodiments. The illustrated structure of the threat protection system is intended merely to serve as an example, and alternative embodiments that have different structures may also be suitable to implement the forensics-based clustering techniques disclosed herein.

As depicted in FIG. 1, a threat protection system 100 is coupled to an enterprise computing environment 120 and the Internet or other external network 130. Threat protection system 100 includes a graph-based exploration and analysis tool 102 which includes a forensics-based clustering engine 104. Graph-based exploration and analysis tool 102 also includes a "similar" threat search interface 106 and a dynamic URL scanning engine 108.

Graph-based exploration and analysis tool 102 is configured to identify URLs (e.g., URLs that are contained in emails addressed to recipients that are users of enterprise computing environment 120) that present a potential threat. These URLs are scanned by dynamic scanning engine 108, and the information identified by the scanning engine is used to determine whether or not the URLs are threats or potential threats to the enterprise computing environment or its users. The information identified by dynamic scanning engine 108 for URLs that are determined to be threats or potential threats is stored by the dynamic scanning engine in a database 110 in connection with the threat URLs. The information stored in database 110 includes forensic elements which are associated with each of the threat URLs. As noted above, these forensic elements may include behaviors such as accessing particular DNS addresses, downloading files, accessing registry keys, and the like.

The threat information stored in database 110, including identification of the threat URLs and the associated forensic elements, is accessible by forensics clustering engine 104. Forensics clustering engine 104 processes the stored threat information to identify forensic elements which are common to two or more of the threat URLs. Forensics clustering engine 104 then generates a score for each pair of the threat URLs based on the forensic elements which are common to each of the URLs. This score represents the similarity of the two URLs in the pair. The similarity score takes into account both malicious and non-malicious forensic elements that are common to the pair of threat URLs.

Forensics clustering engine 104 then uses the graphing capabilities of graph-based exploration and analysis tool 102 to graph the "closeness" of the threat URLs to each other, where the closeness is based on a "distance" that is represented by the similarity score for each pair of the URLs. Graph-based exploration and analysis tool 102 can then identify clusters of the threat URLs which are close together (based on the similarity scores), and forensics clustering engine 104 can identify each cluster of threat URLs as a group which is related, based on the forensic elements associated with each of the URLs.

The groups of URLs that are identified by forensics clustering engine 104 are stored in threat cluster database 112. The stored threat cluster data can be accessed by a user through search interface 106. The user can access and search threat URL database 112 using search interface 106. Using this search interface, the user can identify threat URLs which are similar to the selected URL, based on the forensic elements that are associated with each of the URLs. The system may also be configured to allow the user to browse clusters identified in representations of the clusters threat URLs generated by the graph-based exploration and analysis tool. Threat cluster database 112 can also be accessed through internal APIs of forensics clustering engine 104. When the group of similar URLs (similar to the selected URL) has been identified, the group of URLs can be addressed together (e.g., campaigned together) rather than having to address them individually.

Figure 2:
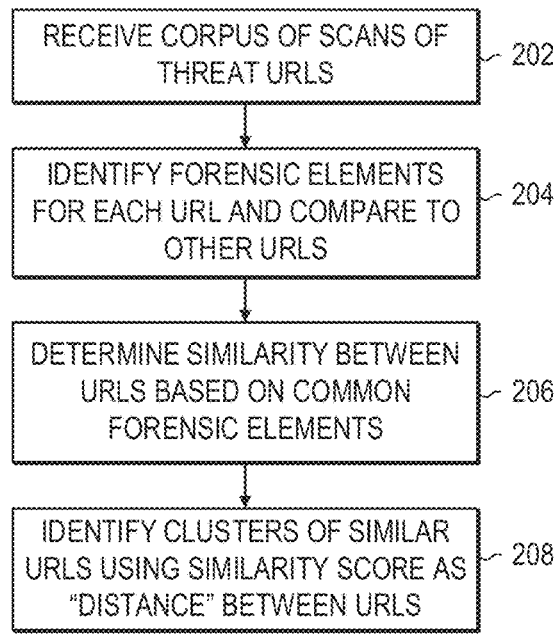
FIG. 2 is a flow diagram illustrating a method for identifying groups of similar threat URLs in accordance with some embodiments.

Referring to FIG. 2, a flow diagram illustrating a method for identifying groups of similar threat URLs in accordance with one embodiment is shown. In one embodiment, this method may be implemented within the graph-based exploration and analysis tool of FIG. 1. In alternative embodiments, this or similar methods may be implemented in other components of a threat protection system, or in components of a system having a structure which is different than the example of FIG. 1.

The method of FIG. 2 begins with receipt of a corpus of threat URL information by a forensics clustering engine of the graph-based exploration and analysis tool (step 202). The received threat information includes identifiers of each of the examined URLs, as well as the forensic elements associated with each of the URLs. The threat information includes only URLs which have been determined to be malicious, or are suspected of being malicious, and does not include benign URLs.

In some embodiments, this threat information is generated by a dynamic scanning engine of the graph-based exploration and analysis tool during the normal course of examining URLs to determine whether they are benign or malicious (or suspected of being malicious). The data may alternatively be generated by other components or subsystems of the threat protection system. The forensic elements included in the threat data may be identified, for example, by opening each threat URL in an isolated, sandboxed environment and recording the behaviors of the URL.

The data received by the forensics clustering engine may represent a limited period of collection of URL data. For example, the URL threat data may include information generated based on scans of URLs contained in messages received over the preceding 30 days. The forensic element data need not follow a predetermined structure, but may instead include any forensic elements that happen to be identified for any particular URL.

When the forensics clustering engine receives the corpus of data corresponding to the threat URLs, the engine identifies the forensic elements corresponding to each of the URLs and compares the forensic elements to determine whether any of the forensic elements that are common to two or more URLs (step 204). The comparison includes both malicious forensic elements, such as attempting to download a malicious file, and non-malicious forensic elements, such as accessing a benign URL. The results of the comparison are recorded by the forensics clustering engine for use in determining the similarity of the URLs to each other. In one embodiment, forensic elements for determining similarities between the URLs may be pruned to eliminate comparison data that is not useful for determining whether particular URLs should be grouped together.

The forensics clustering engine then determines the similarity of each pair of URLs (step 206). The similarity determination may consider both common malicious forensic elements and non-malicious forensic elements. For each forensic element that is common to a pair of URLs, there is a corresponding contribution to the similarity score of the pair. While the common malicious elements contribute most strongly to the similarity score, the non-malicious forensic elements which are associated with the pair of URLs may indicate similar origins of the URLs and are therefore considered in determining the similarity score.

The similarity score for each pair of threat URLs provides an indication of the closeness of the URLs. Higher similarity scores indicate that the URLs are closer together, and lower similarity scores indicate that the URLs are father apart. The similarity scores are therefore used as an indication of the "distance" between the URLs for the purpose of graphing the URLs and determining which of the URLs should be grouped together. The distance between two threat URLs is calculated as a function of how many forensic elements they have in common, and whether those common forensic elements are malicious or not. The more forensic elements the URLs have in common, and the more malicious those forensic elements are, the closer those two threats are considered to be.

The overall similarity scores for each pair of URLs is provided to the graph-based exploration and analysis tool, which graphs the URLs based on the distance between each pair of URLs and then uses a graph neighborhood technique to graphically identify clusters of the URLs which are close together and to group URLs that are within the same general vicinity of each other (step 208). Rather than looking at each forensic element one at a time and calculating the distance based on individual elements, the graph neighborhood technique essentially finds all of the URLs that are in the same general vicinity of one another and considers them to be similar. Thus, all of the threat URLs that are closest to each other tend to be grouped together, and the URLs that are farthest apart tend to be outside those groups. The number of URLs within a cluster is not limited—a cluster may have a single URL, or many URLs.

In some embodiments, the distance between URLs is determined based on a similarity score that is calculated from the numbers of forensic elements that are shared between respective pairs of URLs. This score may take into account both malicious forensic elements and non-malicious forensic elements, and an example of a specific method of calculation of the score is provided below. In other embodiments, the distance between URLs may be determined using a matrix-based score. In these embodiments, the forensic elements of each URL are represented in a corresponding matrix. The similarity between each pair of URLs is calculated using a cosine similarity function (see, e.g., https://en.wikipedia.org/wiki/Cosine_similarity). When using the cosine similarity function, a greater difference in the forensic element values corresponds to a greater "angle" between the respective URL matrices and a greater distance between the URLs.

Some embodiments may use a technique called tree-based clustering (TBC), or a derivation of TBC. This technique essentially plots out where graph elements (e.g., URLs) are on a grid, and the distance between the URLs on the grid determines how close together the URLs are. Clusters are then identified to include URLs that are relatively close to each other and relatively far away from other URLs. This technique is essentially using a visual methodology implemented in code to try and identify the groupings (clusters) of URL elements.

Figure 3:
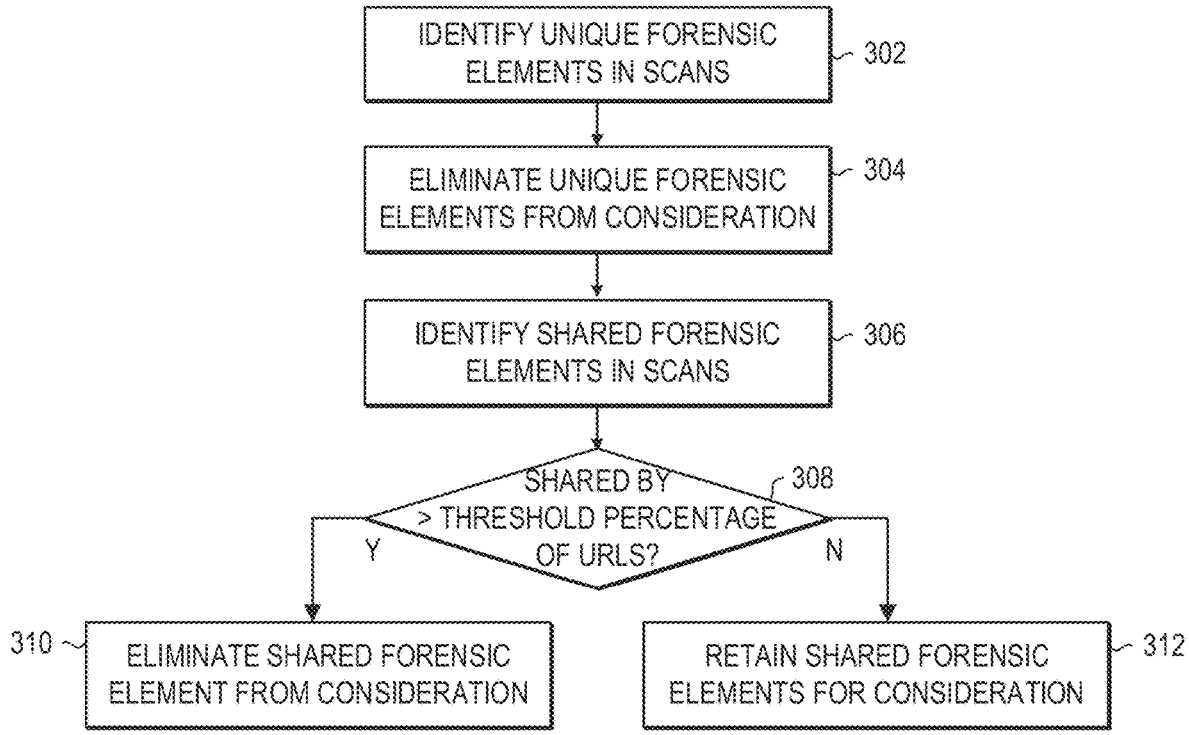
FIG. 3 is a flow diagram illustrating a method for pruning forensic elements to be considered in determining threat similarity in accordance with some embodiments.

Referring to FIG. 3, a flow diagram illustrating a method for pruning forensic elements to be considered in determining threat similarity in accordance with one embodiment is shown. As noted above, some comparison data may not be useful for determining whether particular URLs should be grouped together. For example, forensic elements that are unique to a single one of the URLs are not useful because, by definition, these forensic elements do not indicate any commonality between two or more URLs.

Accordingly, unique forensic elements in the corpus of data corresponding to the threat URLs are identified (step 302), and these unique forensic elements are eliminated from consideration (step 304). In one embodiment, the unique forensic elements may simply be deleted from a working copy of the corpus of data. If the corpus of data may later be updated to include information from other scans, the unique forensic elements may be identified as such so that they will not be considered, but may be retained in the event that later-added data may also include these forensic elements (rendering them non-unique).

In addition to eliminating unique forensic elements from consideration, this embodiment eliminates "super-nodes" from consideration by the forensics clustering engine. In the context of graph theory, a "super-node" is a vertex of a graph with a disproportionately high number of incident edges. In the present embodiments, super-nodes are forensic elements which are shared by a large number of URLs. Because these forensic elements are common to many of the URLs, they typically are not distinctive. That is, they are shared by so many URLs that they do not effectively distinguish a particular subset of the URLs as being similar. Thus, for example, if most URLs access ABC.com, this forensic element is not relevant to distinguishing the URLs as belonging to a particular group. In one embodiment, super-nodes may be defined as forensic elements that are shared by a threshold percentage (e.g., at least 40%) of the URLs in the threat database. In some embodiments, different thresholds may be used with different types of forensic elements. For instance, a forensic element of a first type may have a first threshold (e.g., 40%) while a forensic element of a second type may have a second threshold (e.g., 50%).

In the example of FIG. 3, "super-nodes" are removed from consideration by identifying which of the forensic elements in the corpus of URL threat information are shared between two or more URLs (step 306). It is then determined, for each of the shared forensic elements, whether the forensic element is shared by more than a particular percentage of the URLs (step 308). In one embodiment, this is done for each forensic element by determining the number of threats that share the forensic element, dividing this number by the total number of threats, and determining whether the result is at least a threshold percentage. For example, if at least 40% of the URLs share the forensic element, then it is deemed to be a "super-node". If the forensic element is a "super-node" which is shared by more than the designated percentage of the URLs, then it is removed from consideration (step 310). Otherwise, the shared forensic element is not deemed to be a "super-node", and it is retained for consideration in determining the similarities of the URLs (step 312).

Although not explicitly shown in the figure, some embodiments may also eliminate forensic elements using a safe-list or other rules that may identify a forensic element as "safe." In one embodiment, a safe-list may be maintained by the system, where the safe-list identifies forensic elements that are common and are known to be safe. The system can therefore compare the corpus of URL threat information to the forensic elements in the safe-list and eliminate from the corpus any forensic elements that are included in the safe-list.

Figure 4:
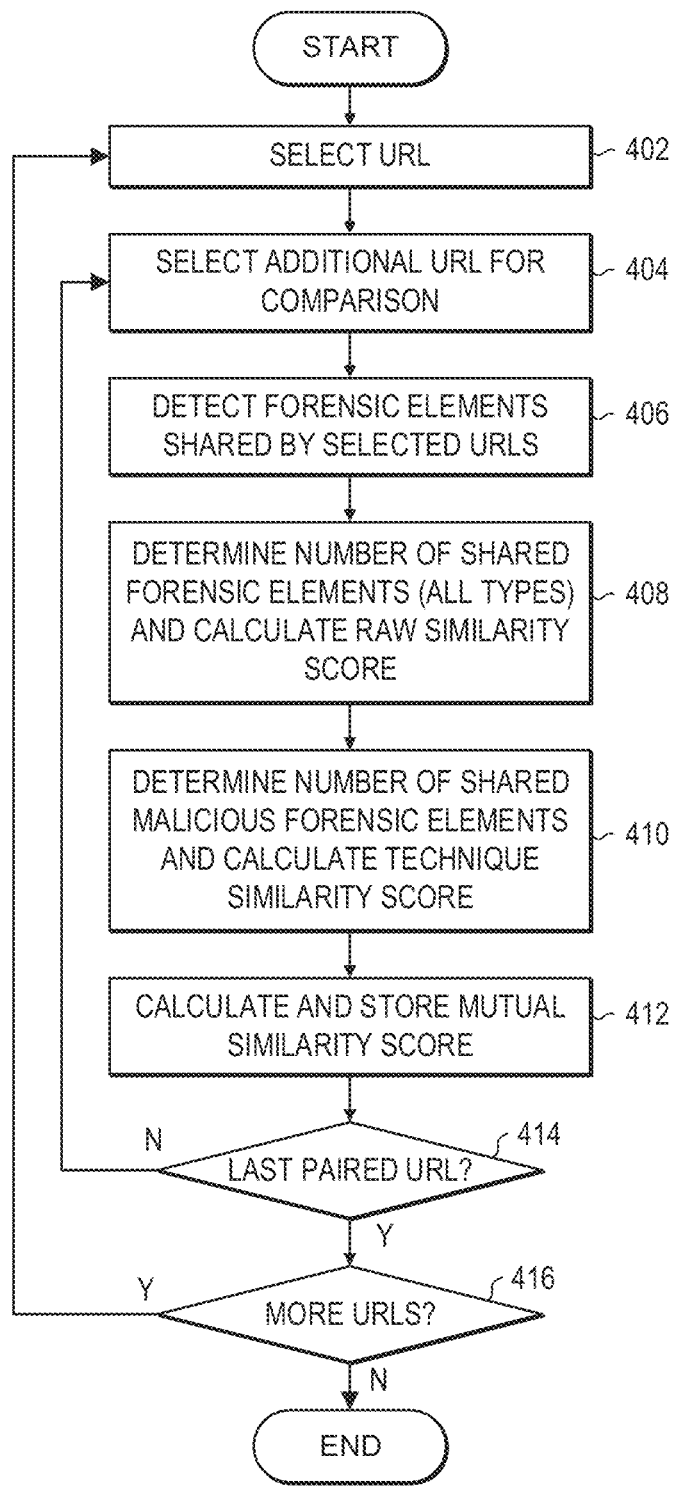
FIG. 4 is a flow diagram illustrating an example of a method for determining the similarity of threat URLs in accordance with some embodiments.

Referring to FIG. 4, a flow diagram illustrating an example of a method for determining the similarity of threat URLs in accordance with one embodiment is shown. In this embodiment, after the unique and "super-node" forensic elements have been eliminated, a first one of the threat URLs is selected (step 402) and one additional threat URL is selected for comparison (step 404). Both of these URLs are examined to identify ones of the forensic elements that are shared by both of the URLs (step 406). The shared forensic elements may include both shared malicious forensic elements and shared non-malicious forensic elements.

A "raw" similarity score is then determined by based on the number of shared forensic elements of all types—both malicious and non-malicious (step 408). For the purposes of this disclosure, "raw" similarity is the similarity between all types of forensic elements of the URLs, including both malicious elements and non-malicious elements. For each forensic element that is common to a pair of URLs, there is a corresponding contribution to the raw similarity of the pair. The raw similarity provides an indication of the forensic connections between the two URLs without regard to whether these connections are directly indicative of a threat.

It should be noted that, although the benign forensic elements which are associated with the pair of URLs being examined do not directly indicate a threat-based connection between the two, these elements are nevertheless relevant to determining the similarity of the URLs because they may indicate similar origins of the URLs. For example, consider two URLs that have been identified as threats. For example, one URL may use a phishing attack, which is an attempt to trick any of a number of victims into sharing sensitive information such as passwords, usernames, and credit card details, while another may use a spearphishing attack, which is a targeted attempt to steal sensitive information from a specific victim. Even if the malicious forensic elements of the two are not similar, they may have been originated by the same bad actor and consequently may have been developed by the same programmers. These programmers may have used the same approach to design the threat, even though the threat itself may use a different technique and may attack different people. For example, the URLs may be designed using the same materials, they may use the same DNS addresses, and they may use the same underlying pieces. Consequently, these benign forensic elements of the URLs may indicate that they are similar, apart from the malicious forensic elements.

In one embodiment, the raw similarity score is calculated using the formula:

$$S_R = (Ns*2)/(N_1+N_2)$$

where $S_R$ is the raw similarity score, Ns is the number of shared forensic elements, $N_1$ is the number of forensic elements for the first threat URL, and $N_2$ is the number of forensic elements for the second threat URL.

In addition to determining the raw similarity of each pair of URLs, forensics clustering engine determines a technique similarity between the URLs (step 410). For the purposes of this disclosure, the "technique" similarity score is a measure of how many malicious forensic elements are shared between the two URLs. Thus, if two URLs include a common attack within their respective forensic elements, this contributes to the technique similarity score. In one embodiment, the technique similarity score is determined by the number of malicious forensic elements as a percentage of the total number of shared forensic elements. Forensic elements which are not malicious (e.g., accesses to a benign URL) do not contribute to the technique similarity between the URLs (i.e., additional non-malicious forensic elements do not add to the technique similarity score), so the technique similarity gives a more threat oriented indication of the connections between the URLs. If the URLs have more attacks in common, the technique similarity will be higher, while fewer common attacks will result in a lower technique similarity score.

In one embodiment, the technique similarity score is calculated using the formula:

$$S_T = N_M/N_S,$$

where $S_T$ is the technique similarity score, $N_M$ is the number of shared malicious forensic elements, and $N_S$ is the total number of shared forensic elements, including malicious and non-malicious elements.

The forensics clustering engine then uses the raw similarity and technique similarity to generate an overall or mutual similarity score for the pair of URLs (step 412). The mutual similarity score uses weighted contributions of both the raw similarity and technique similarity to provide a representation of the overall similarity of the pair of threat URLs and their "closeness" for the purposes of determining whether to group them together.

Generally, the technique similarity (which represents common threat-related forensic elements) is weighted more heavily, while the raw similarity (which includes non-threat-related elements) is less heavily weighted. In one embodiment, for example, the technique similarity is weighted at 60% and the raw similarity is weighted at 40%. The mutual similarity score can therefore be calculated using the formula:

$$S_M = (S_R*W_R)+(S_T*W_T),$$

where $S_M$ is the mutual similarity score, $S_R$ is the raw similarity score, $W_R$ is a weight (e.g., 0.4) for the raw similarity score, $S_T$ is the technique similarity score, and $W_T$ is a weight (e.g., 0.6) for the technique similarity score.

After the mutual similarity score for the pair of threat URLs is calculated, it is determined whether there are additional URLs that have not been compared to the first URL (step 414). If there are additional URLs, the another URL is selected for comparison to the first URL, and the process of determining the raw similarity score, technique similarity score and mutual similarity score (steps 406-412) is repeated for this new pair of URLs. After the first URL has been compared to each of the remaining URLs, another of the URLs is selected, and the process of comparing this URL to each of the other URLs in the corpus of threat URL data (steps 404-412) is repeated for the new URL (step 416). Since this new URL has already been compared to the first URL, it is not necessary to repeat this comparison, but the process will be performed for the remaining URLs. Similarly, each subsequent iteration of the process will require one less comparison of threat URL pairs. When all of the possible pairs of the threat URLs have been compared, the scoring process is complete, and the scores are used to determine the closeness of the URLs and the resulting clusters of the URLs.

Figure 5:
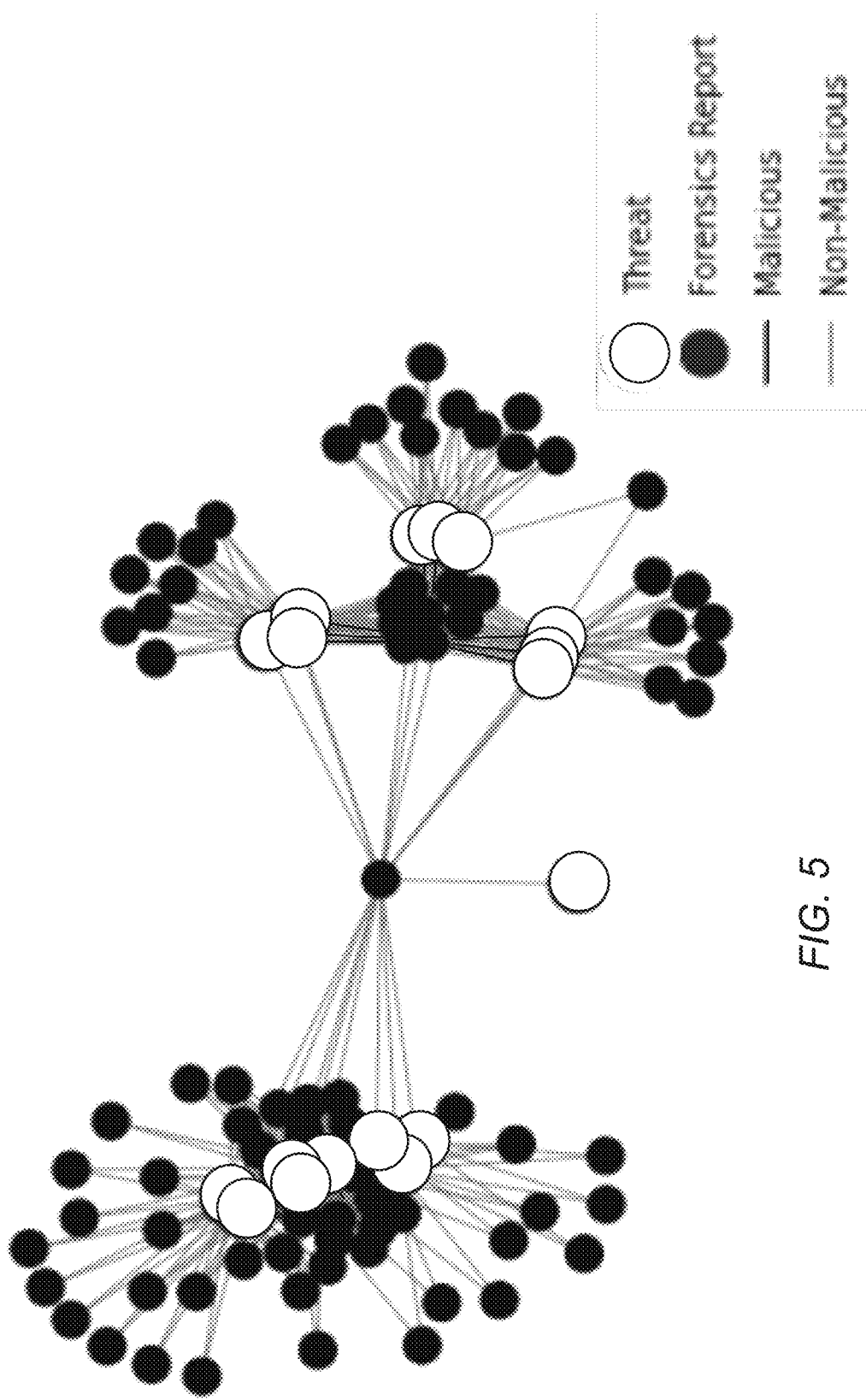
FIGS. 5 and 6 are diagrams illustrating graphical displays of example clusters of threat URLs in accordance with some embodiments.
Figure 6:
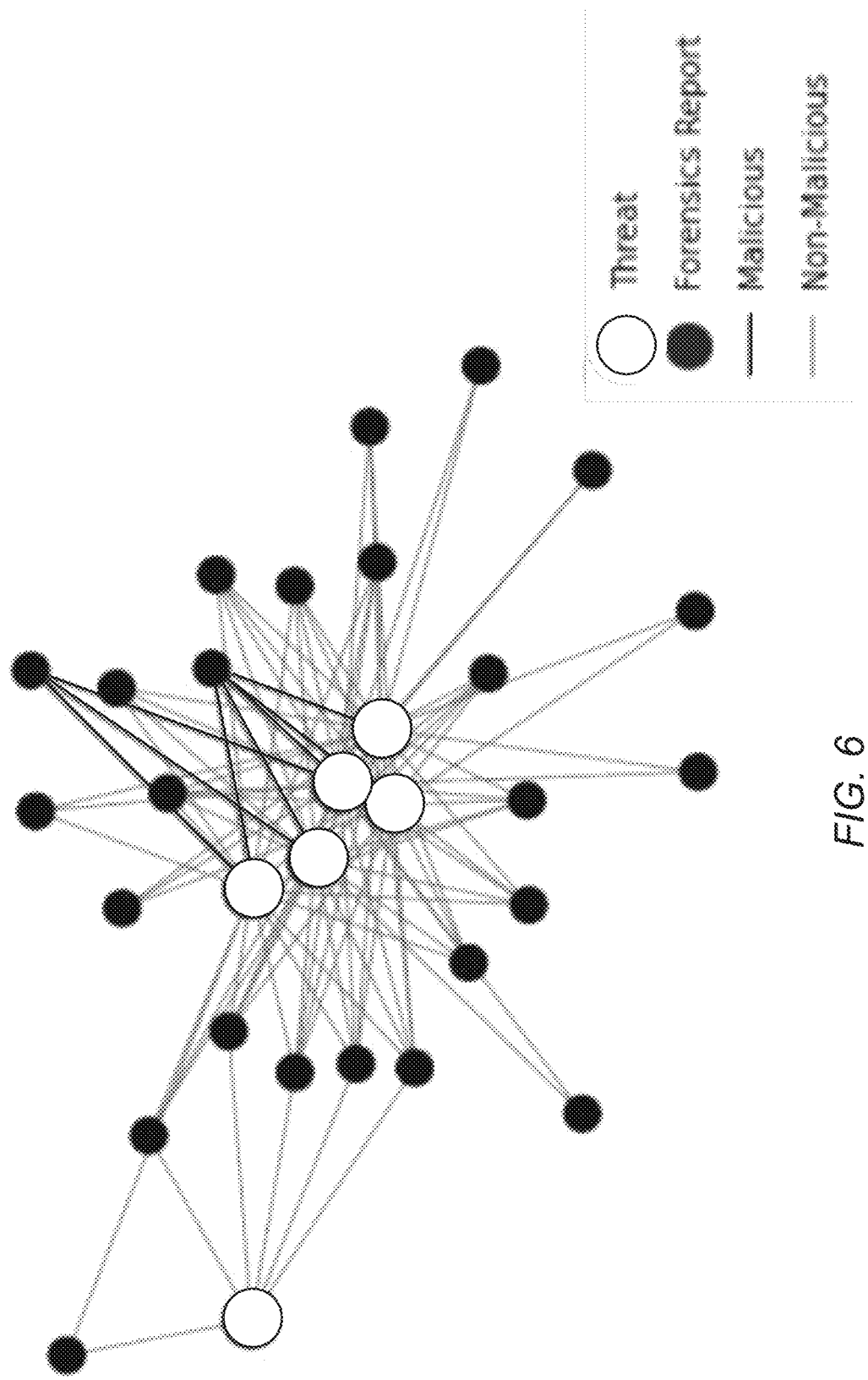

Examples of the results of the generated information regarding threat URL similarity are illustrated in FIGS. 5 and 6. In the example of FIG. 5, a first cluster of threat URLs is depicted. This cluster includes 18 threat URLs that have a common forensic element (seen at the center of the figure). The threat URLs in this instance may, for example, all be variants of a PhishPunch attack. It can be seen from the figure that there are two distinct sub-groups of the URLs within the cluster, representing two variants (e.g., PhishPunch.Generic_Mail_Verification and PhishPunch.Hosted_Typeform).

In the example of FIG. 6, there are six threat URLs. This example represents a scenario in which not all of the threat URLs share the same malicious behavior, but there is another commonality that is shared between them. The five threat URLs near the center of the figure all show malicious behavior (e.g., PhishPunch and DuckHunt), but all of the threats share three file hashes in their forensics, so they are grouped together in the same cluster.

After the clusters of threat URLs have been identified based on forensic similarities, this information can be accessed in a variety of ways. In one embodiment, the information can be accessed through a "similar threat" search interface. If, for example, a user is examining a particular threat and wants to know if there are any other similar threats, the user can provide the particular threat as an input to the search interface. The selected thread is then used by a lookup mechanism to retrieve similar threats (i.e., threats that have been grouped in the same cluster as the selected thread) from the generated forensics-based threat cluster information. The user can then address the identified threats as a group rather than having to click through each of the threats individually.

Figure 7:
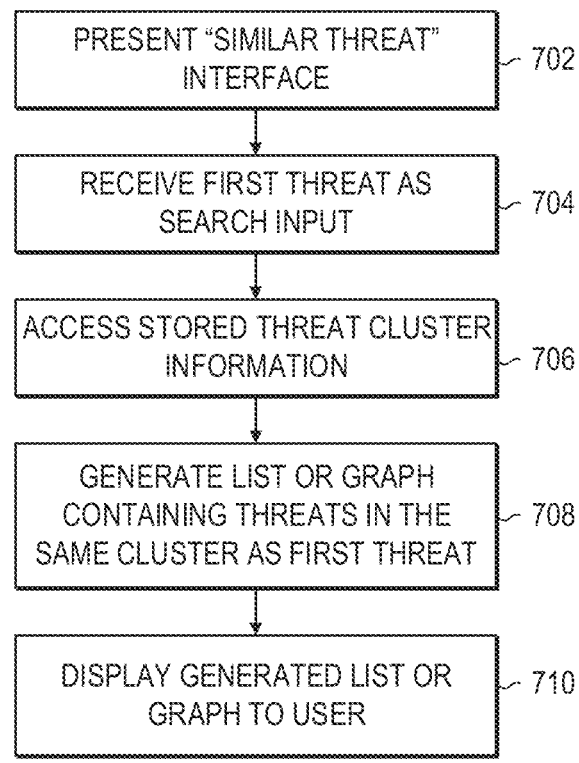
FIG. 7 is a flow diagram illustrating an example of a method for determining the similarity of threat URLs in accordance with some embodiments.

Referring to FIG. 7, a flow diagram illustrating an example of a method for determining the similarity of threat URLs in accordance with one embodiment is shown. In this embodiment, an interface is presented to a user who is examining a particular threat URL (step 702). The user may select the URL and provide the URL as input to the similar threat search interface (step 704). For instance, the threat URL may be implicitly selected since it is being examined when the search interface is initiated, or it may be explicitly input to the search interface. When the threat URL is input to the search interface, the previously stored threat cluster data is queried to determine whether any other threat URLs are identified as being included in the same cluster as the selected URL (step 706). The threat cluster data may, for example, be stored in a backend database, and the input threat URL can be looked up in the database to identify the threats that are included in the same cluster as the URL input to the similar threat interface. The threat URLs that are retrieved by the search may, for example, be included in a simple list, used to generate a graph that indicates the similarity of these threat URLs to the URL selected by the user, etc. (step 708). The list, graph or other information identifying the threat URLs in the cluster as being similar to the selected URL is then displayed to the user via the search interface (step 710).

The generated threat cluster information can also be accessed through internal APIs of the threat protection system. A researcher or analyst can use the generated threat cluster information to identify groups of threats that can be campaigned together, or that should be reported to a customer as a group because of the similarity of the threats.

Figure 8:
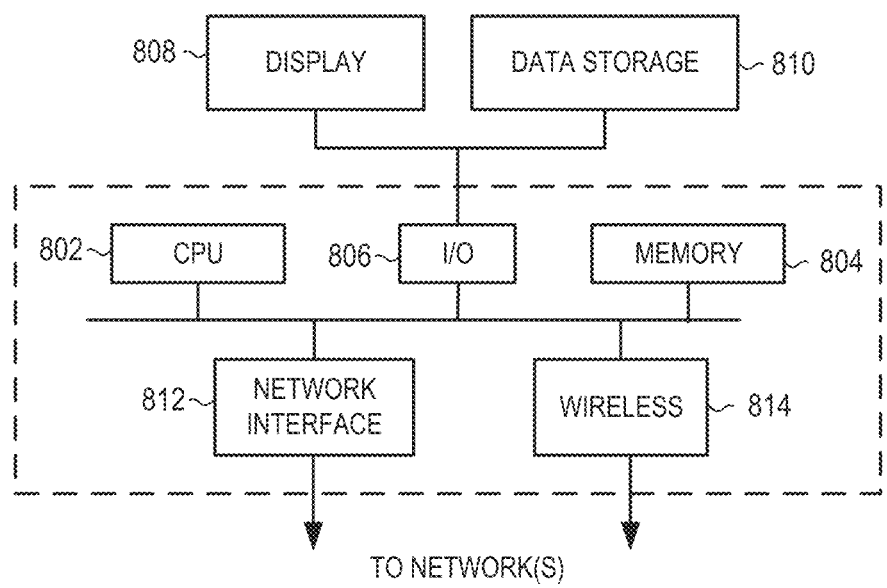
FIG. 8 is a block diagram illustrating an example of a computer structure in which some embodiments can be implemented.

Embodiments discussed herein can be implemented in a computer communicatively coupled to a network (for example, the Internet), another computer, or in a standalone computer. As illustrated in FIG. 8, a suitable computer can include a central processing unit ("CPU" 802), a computer memory (804) such as a read-only memory ("ROM"), random access memory ("RAM") or hard drive ("HD"), and one or more input/output ("I/O") devices 806). The I/O devices, which can be coupled to a display (808) and a data storage device (810), can include a keyboard, monitor, printer, electronic pointing device (for example, mouse, trackball, stylus, touch pad, etc.), or the like. In embodiments of the invention, the computer has a network interface (812) and a wireless component (814) for communicating with other computing devices over various types of networks.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendix, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendix, the meaning of "in" includes "in" and "on" unless the context clearly dictates otherwise.

It should be understood that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure. It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

What is claimed is:

1. A method comprising:
   obtaining a corpus of forensic data for a plurality of threat URLs, wherein the corpus of forensic data includes, for each of the plurality of threat URLs, a set of corresponding forensic elements, wherein the corresponding forensic elements comprise behaviors exhibited by the threat URL when the threat URL is executed;
   for each pair of threat URLs in the plurality of URLs,
      examining the corresponding forensic elements in the corpus of forensic data,
      comparing forensic elements of a first threat URL of the pair of threat URLs to forensic elements of a second threat URL of the pair of threat URLs, and
      generating a similarity score for the pair of threat URLs based on the comparing, wherein the generating the similarity score for the pair of threat URLs comprises generating a mutual similarity score, including: generating a raw similarity score based on all types of shared forensic elements of the first threat URL and the second threat URL: generating a technique similarity score based on a number of shared malicious forensic elements of the first threat URL and the second threat URL; and generating the mutual similarity score as a weighted combination of the raw similarity score and the technique similarity score; and
   identifying clusters of the plurality of threat URLs based on the similarity scores of the pair of threat URLs, wherein each cluster includes a subset of the plurality of threat URLs.

2. The method of claim 1, further comprising generating a similar threat search interface which is configured to receive user input identifying a selected one of the plurality of threat URLs, retrieving from stored indications of the threat URLs in each of the identified clusters a set of one or more threat URLs that are in the same cluster as the selected one of the plurality of threat URLs, and presenting the retrieved threat URLs at the similar threat search interface.

3. The method of claim 1, further comprising eliminating unique forensic elements prior to comparing the forensic elements of the first threat URL to forensic elements of the second threat URL.

4. The method of claim 1, further comprising eliminating super-node forensic elements prior to comparing the forensic elements of the first threat URL to forensic elements of the second threat URL, wherein super-node forensic elements comprise forensic elements that are shared by at least a predetermined percentage of the plurality of threat URLs.

5. The method of claim 1, wherein generating the raw similarity score for the pair of threat URLs comprises:
   determining a number $N_1$ of forensic elements of all types of the first threat URL;
   determining a number $N_2$ of forensic elements of all types of the second threat URL;
   determining a number Ns of forensic elements of all types shared by the first threat URL and the second threat URL; and
   calculating the raw similarity score $S_R$ using the equation $S_R=(N_S*2)/(N_1+N_2)$.

6. The method of claim 1, wherein generating the technique similarity score for the pair of threat URLs comprises:
   determining a number $N_M$ of forensic elements of malicious types shared by the first threat URL and the second threat URL;
   determining a number $N_S$ of forensic elements of all types shared by the first threat URL and the second threat URL; and
   calculating the technique similarity score $S_T$ using the equation $S_T=N_M/N_S$.

7. The method of claim 1:
   wherein generating the raw similarity score $S_R$ for the pair of threat URLs comprises
      determining a number $N_1$ of forensic elements of all types of the first threat URL,
      determining a number $N_2$ of forensic elements of all types of the second threat URL,
      determining a number Ns of forensic elements of all types shared by the first threat URL and the second threat URL, and
      calculating the raw similarity score $S_R$ using the equation $S_R=(N_S*2)/(N_1+N_2)$;
   wherein generating the technique similarity score $S_T$ for the pair of threat URLs comprises
      determining a number $N_M$ of forensic elements of malicious types shared by the first threat URL and the second threat URL,
      determining a number $N_S$ of forensic elements of all types shared by the first threat URL and the second threat URL, and
      calculating the technique similarity score $S_T$ using the equation $S_T=N_M/N_S$;
   wherein generating the mutual similarity score $S_M$ for the pair of threat URLs comprises calculating the mutual similarity score $S_M$ using the equation $S_M=S_R*W_R+S_T*W_T$, where $W_R$ and $W_T$ are weighting factors.

8. The method of claim 1, wherein identifying clusters of the plurality of threat URLs comprises:
   providing the similarity scores of each pair of threat URLs to a clustering engine;
   analyzing, by the clustering engine, the similarity scores of the pairs of threat URLs as distances with greater similarity scores corresponding to closer distances between the corresponding pair of threat URLs;
   identifying one or more clusters of the threat URLs, wherein for each of the identified clusters, the threat URLs in the cluster are deemed to have a high degree of similarity based on the similarity scores; and
   storing indications of the threat URLs in each of the identified clusters.

9. The method of claim 8, wherein the one or more clusters of the threat URLs are identified using a neighborhood clustering algorithm, and wherein the indications of the threat URLs are stored in a lookup table which is accessible to look up a selected threat URL, the lookup table identifying each threat URL in the one of the clusters that includes the selected threat URL.

10. The method of claim 8, wherein obtaining the corpus of forensic data comprises, for each of the plurality of threat URLs, performing a scan of the threat URL and recording resulting forensic elements resulting from the scan.

11. The method of claim 10, wherein performing the scan of the threat URL comprises opening the threat URL in a sandboxed environment and recording resulting behaviors as forensic elements.

12. A system comprising:
   a processor coupled to a memory that stores one or more instructions, the instructions executable by the processor to perform:
      obtaining a corpus of forensic data for a plurality of threat URLs, wherein the corpus of forensic data includes, for each of the plurality of threat URLs, a set of corresponding forensic elements, wherein the corresponding forensic elements comprise behaviors exhibited by the threat URL when the threat URL is executed;
      for each pair of threat URLs in the plurality of URLs, examining the corresponding forensic elements in the corpus of forensic data,
         comparing forensic elements of a first threat URL of the pair of threat URLs to forensic elements of a second threat URL of the pair of threat URLs, and
         generating a similarity score for the pair of threat URLs based on the comparing, wherein the generating the similarity score for the pair of threat URLs comprises generating a mutual similarity score, including: generating a raw similarity score based on all types of shared forensic elements of the first threat URL and the second threat URL: generating a technique similarity score based on a number of shared malicious forensic elements of the first threat URL and the second threat URL; and generating the mutual similarity score as a weighted combination of the raw similarity score and the technique similarity score; and
      identifying clusters of the plurality of threat URLs based on the similarity scores of the pair of threat URLs, wherein each cluster includes a subset of the plurality of threat URLs.

13. The system of claim 12, further comprising a similar-threat search interface which is configured to: receive user input identifying a selected one of the plurality of threat URLs; retrieve from stored indications of the threat URLs in each of the identified clusters a set of one or more threat URLs that are in the same cluster as the selected one of the plurality of threat URLs; and display the retrieved threat URLs.

14. A computer program product comprising a non-transitory computer-readable medium storing instructions executable by one or more processors to perform:
    obtaining a corpus of forensic data for a plurality of threat URLs, wherein the corpus of forensic data includes, for each of the plurality of threat URLs, a set of corresponding forensic elements, wherein the corresponding forensic elements comprise behaviors exhibited by the threat URL when the threat URL is executed;
    for each pair of threat URLs in the plurality of URLs,
        examining the corresponding forensic elements in the corpus of forensic data,
        comparing forensic elements of a first threat URL of the pair of threat URLs to forensic elements of a second threat URL of the pair of threat URLs, and
        generating a similarity score for the pair of threat URLs based on the comparing, wherein the generating the similarity score for the pair of threat URLs comprises generating a mutual similarity score, including: generating a raw similarity score based on all types of shared forensic elements of the first threat URL and the second threat URL: generating a technique similarity score based on a number of shared malicious forensic elements of the first threat URL and the second threat URL; and generating the mutual similarity score as a weighted combination of the raw similarity score and the technique similarity score; and
    identifying clusters of the plurality of threat URLs based on the similarity scores of the pair of threat URLs, wherein each cluster includes a subset of the plurality of threat URLs.

15. The computer program product of claim 14, wherein the instructions are further executable by the one or more processors to perform: generating a similar threat search interface which is configured to receive user input identifying a selected one of the plurality of threat URLs; retrieving from stored indications of the threat URLs in each of the identified clusters a set of one or more threat URLs that are in the same cluster as the selected one of the plurality of threat URLs; and presenting the retrieved threat URLs at the similar threat search interface.

\* \* \* \* \*